United States Patent [19]
Horstmann et al.

[11] Patent Number: 5,674,127
[45] Date of Patent: Oct. 7, 1997

[54] MULTISITE MULTIPLAYER INTERACTIVE ELECTRONIC ENTERTAINMENT SYSTEM HAVING A PARTIALLY PLAYER DEFINED UNIVERSE

[75] Inventors: Keats B. Horstmann, Layton; Stephen L. Fergeson, Clearfield, both of Utah; William E. Deckler, Lafayette, Colo.

[73] Assignee: Habilas, Inc., Roy, Utah

[21] Appl. No.: 400,035

[22] Filed: Mar. 7, 1995

[51] Int. Cl.[6] .................................................. A63F 9/22
[52] U.S. Cl. ................................................ 463/42; 463/46
[58] Field of Search ......................... 463/42, 46; 472/59, 472/60, 130; 434/38, 43, 44, 45, 48

[56] References Cited

U.S. PATENT DOCUMENTS

| | | | |
|---|---|---|---|
| 4,461,470 | 7/1984 | Astroth et al. | 472/60 |
| 4,477,069 | 10/1984 | Crudgington, Jr. | 472/60 |
| 4,960,117 | 10/1990 | Moncrief et al. | 463/46 |
| 5,275,565 | 1/1994 | Moncrief | 434/38 X |
| 5,486,141 | 1/1996 | Ohga et al. | 472/60 |

OTHER PUBLICATIONS

Omni (Publication) Feb., 1995, pp. 47–51.
"A Digital Theme Park", RePlay Magazine, Apr., 1995, pp. 153–156.

*Primary Examiner*—William H. Grieb
*Attorney, Agent, or Firm*—Mallinckrodt & Mallinckrodt

[57] ABSTRACT

A multisite multiplayer interactive electronic entertainment system has a number of cockpits driven by each of several local processors. Each cockpit has a number of high resolution color displays mounted therein, and is mounted on a full motion base. Each cockpit represents a spacecraft in a partially player defined universe. A hub processor connected to each of the several local processors is responsible for maintaining a database of players and player virtual personae, for maintaining a description of a game universe, and for communicating between local processors.

13 Claims, 11 Drawing Sheets

MULTISITE MULTIPLAYER INTERACTIVE ELECTRONIC ENTERTAINMENT SYSTEM HAVING A PARTIALLY PLAYER DEFINED UNIVERSE

BACKGROUND OF THE INVENTION

1. Field

The invention relates to the field of multiplayer, fully immersive, real time, multisensory, interactive, role playing electronic games. These games are immersive in that the players are fully enclosed in the dedicated game environment. These games are multisensory in that the entertainment system stimulates the players through the visual, auditory, tactile, kinesthetic senses. Games of this type are role playing in that each player assumes for game purposes the attributes, or persona of a particular fictional character in the game universe.

2. Prior Art

In a game environment known as "Fighter Town," each player is seated in a cockpit mounted on a hydraulic full motion base, where each cockpit represents a game aircraft. The primary visual graphical display is external to the cockpit, taking the form of a projection screen in front of each cockpit. Game aircraft within the same retail facility may speak with each other, but there are no provisions for communications between game aircraft at different retail facilities.

In a game environment known as "Magic Edge" each player is seated in a cockpit mounted on a hydraulic partial motion base. The primary visual graphics display is a single high display projected in front of the cockpit, driven by a Silicon Graphics Onyx Reality Engine graphical processing engine. Game aircraft within the same retail facility may talk with each other, but there are no provisions for communications between game aircraft at different retail facilities or for communication with players at home computers.

SUMMARY OF THE INVENTION

The present invention comprises a system of interconnected video game devices whereby several players, who may be physically located at more than one disparate location, may interact within the same game universe.

Each player is immersed within a cockpit having an electronic visual display device to stimulate the player's visual sense, a microphone with which a player may talk with other players, and a pair of loudspeakers to stimulate the player's auditory sense. The cockpit also incorporates a touch panel and control devices to allow the player to interact with the system. The cockpit is mounted upon a full motion base to stimulate the player's tactile and kinesthetic senses. Immersion of the player in the game universe is enhanced through fully enclosing each cockpit to exclude extraneous sensory signals from the player.

In order to enhance realism, each cockpit is equipped with a high resolution center display and two lower resolution side, or wing, displays. This display system covers one hundred sixty degrees of the visual field of the player. It has been found that displays totaling approximately 160 degrees of the player's visual field produce a greater subjective feeling of reality in the player's mind than do displays that cover significantly less of the player's visual field.

Each cockpit at a first retail establishment is connected to a local processor. Each local processor at each location is connected through a digital communications network to a hub processor, which is in turn connected to the local processors at other retail establishments.

The hub processor is responsible for maintaining the game universe within which each player is represented as a living entity, which may or may not be human, and each occupied cockpit is a spacecraft engaged in exploration, commerce and raiding within the game universe. The hub processor maintains a database including each player's player characteristics, including a description of the virtual persona of that player's character in the game universe, a record of each player's activity and flights, coordinates of preferred locations and activities for each player, and each player's personal planets within the game universe.

The hub processor may also be interconnected to a plurality of home computers, each of which may also represent a planetary manager, merchant, or other entity engaged in commerce and raiding within the game universe. Players using such home computers will not, however, experience the same degree of immersion in the game universe as a player enclosed in a cockpit.

The hub processor may also create and control several computer driven personalities and spacecraft that may also interact with players in the game universe.

Real time control software is required for each cockpit, for the processor at each retail establishment, and for the hub processor.

The real time software for each cockpit is interrupt driven. Each input event, for example the player fastening the restraint device, generates an interrupt. Upon answering the interrupt, an interrupt handling routine marks the incoming event and associated information in a sequence control table. A sequence control module reads the sequence control table to learn which functional routines must execute, and dispatches the required routines.

The game universe is constructed in part by players. A player may build a world on a home computer by selecting a planet size from a menu of options. Similarly, the type of star the planet orbits, the type, direction, and inclination of orbit relative to the ecliptic, and a number of political, social, and biosphere factors including characteristics of any sentient species may be selected from the menus. Further, a level of industry and a number of military and architectural characteristics may also be selected from the menus for inhabited planets. Each menu selection has a corresponding cost that is deducted from a ration of planetary points.

When a player has constructed a world, the player may submit that world to the hub processor, which will then assign planetary coordinates in the game universe. A player may then visit those worlds she has submitted, as well as others submitted by others, during a cockpit experience.

THE DRAWINGS

The best mode presently contemplated for carrying out the invention is illustrated in the accompanying drawings, in which:

FIG. 1: is a schematic of the system, showing the hub processor, the local processors at each of two or more locations, and two or more cockpits at each location;

FIG. 2: a pictorial view of one cockpit opened to permit a player to enter, showing the electronic visual display, keyboard, and control devices;

FIG. 3: a schematic view of one cockpit, showing the electronic visual display, keyboard, control devices, loudspeakers, and processor;

FIG. 4: a cutaway view of one cockpit, showing the mechanism by which the back of the cockpit is opened to allow a player to enter the cockpit;

FIG. 5: a top view of one cockpit, with the roof cut away to show the arrangement of the front and side screens relative to a player in the seat;

FIG. 6: a block diagram of a silicon graphics reality engine II as used to drive the displays of a number of cockpits in the present invention;

FIG. 7: a plan view showing the layout of a bay containing one cockpit opened for boarding;

FIG. 8: a sectional side view showing a hydraulic mechanism for opening and closing the cockpit back;

FIG. 9: a flow chart of a sequence control module as used in the control software for the system;

FIG. 10: a flow chart of the master control module, as used in the control software for the system; and FIG. 11: a diagram showing the interaction of the master control module and the several sequence control modules as used in the control software for the system.

DETAILED DESCRIPTION OF THE ILLUSTRATED EMBODIMENTS

The game system of the present preferred embodiment incorporates a hub processor 40 and several retail facilities. Each retail facility further comprises a local processor 19 and a number of cockpits 20. The hub processor 40 may also be connected to one or more home computers 16.

Figure 1:
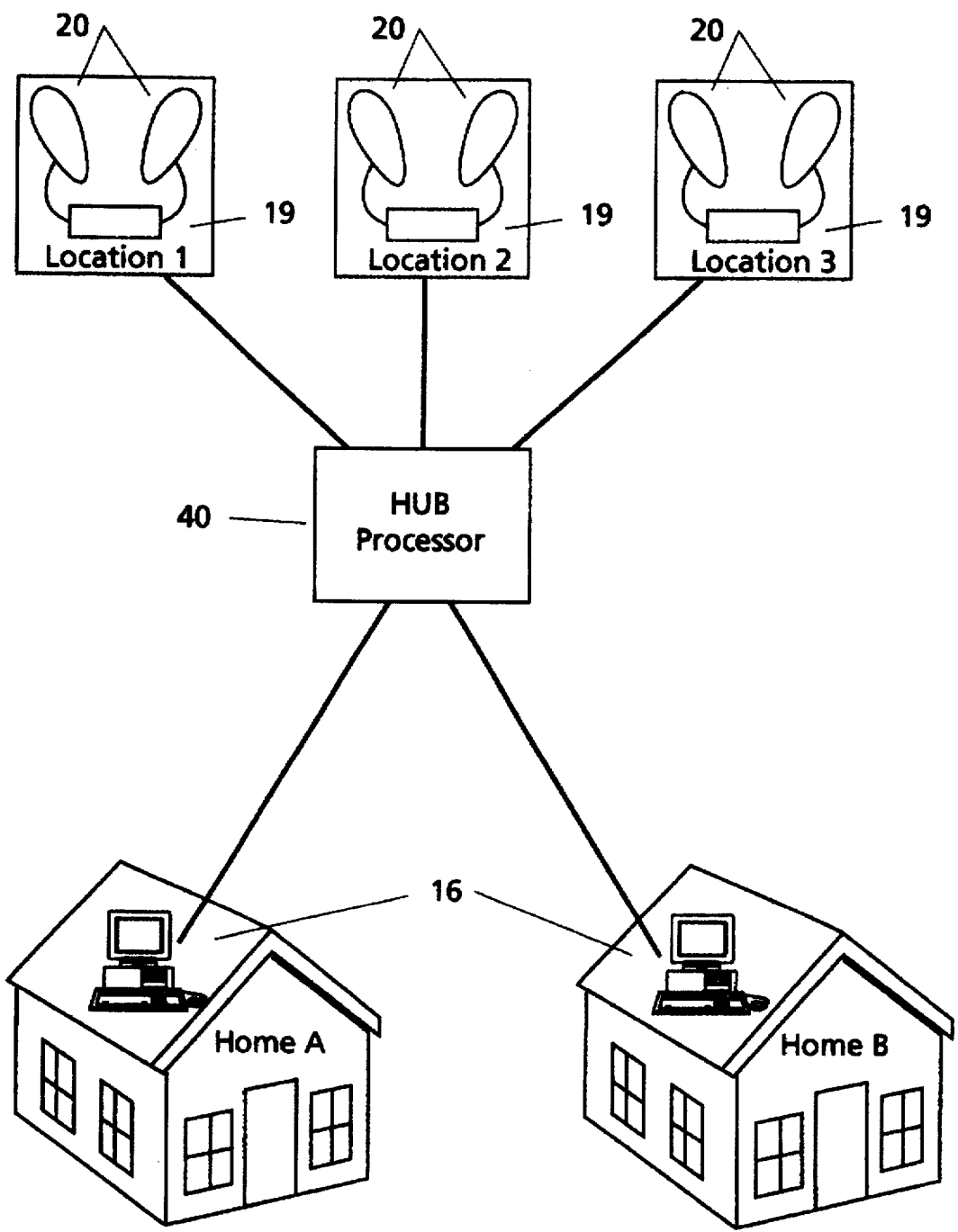
Figure 2:
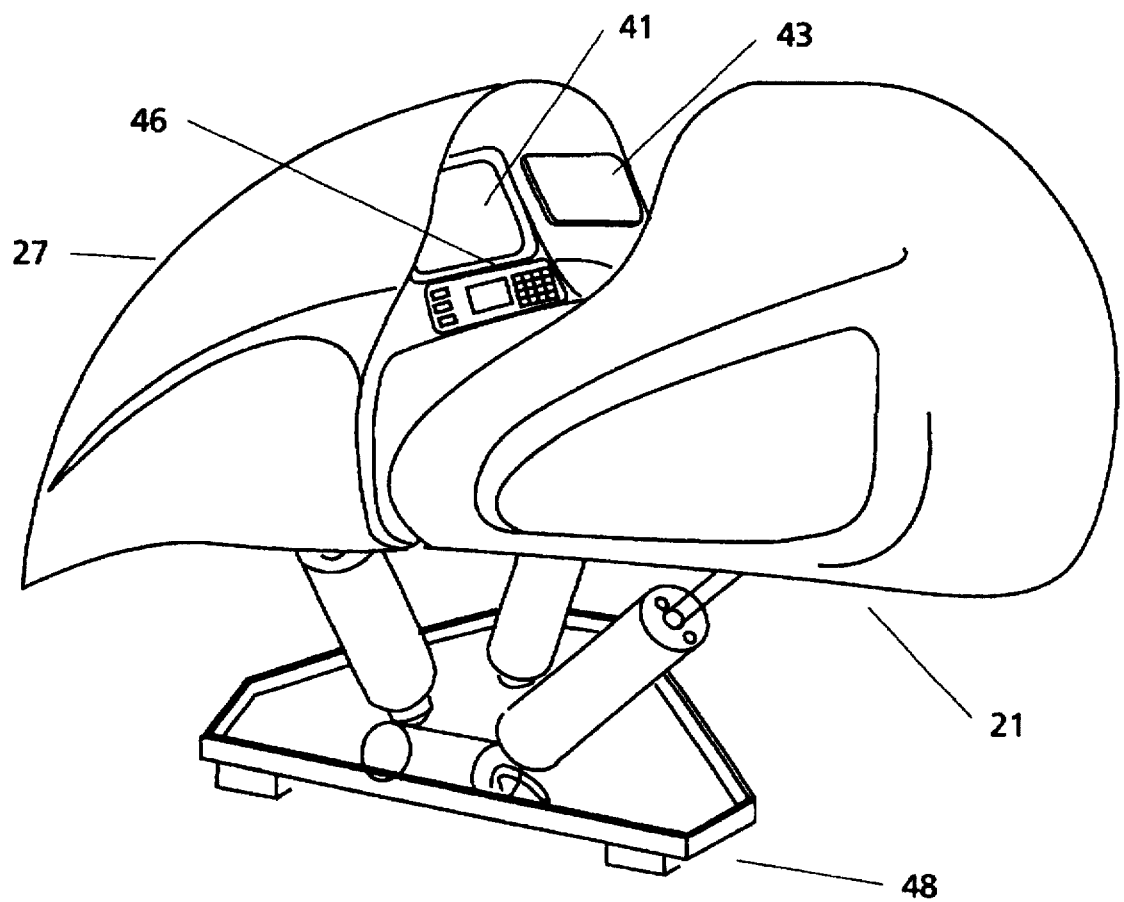
Figure 5:
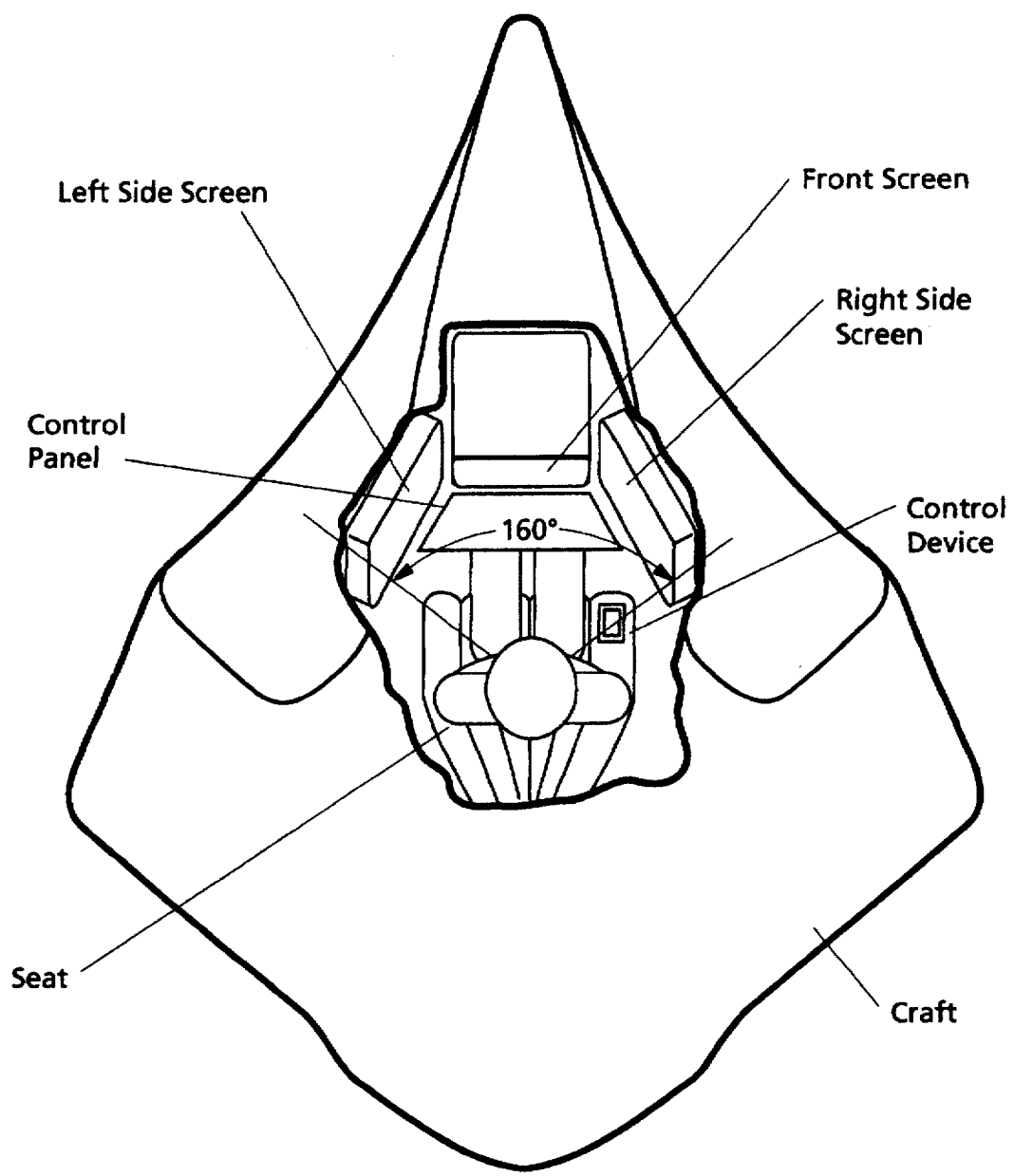

Each cockpit station 20 further comprises an electropneumatic full motion base 48, and a motion base controller connected to the local processor 19. The cockpit front 27 (FIG. 2) is mounted upon the full motion base 48. Each cockpit also has a front display 41, a left side display 42, and a right side display 43. As shown on FIG. 5, the three displays 41, 42, and 43 subtend 160 degrees of a player's field of view when the cockpit back 21 (FIG. 2) is in a closed position against cockpit front 27 to enclose a player seated in seat 28. All three displays for the cockpit are driven by the local processor 19. The seat is equipped with a restraint system having a restraint-fastened sensor switch 33 that is also connected to the local processor 19.

Each cockpit is also equipped with a left speaker 49, a right speaker 50, a microphone 44, a control device 45, a touch panel 46, an identity card swiping device 51 inside the cockpit, a second identity card swiping device 17 outside the cockpit, and a motor drive 24 for opening and closing the cockpit. An electronic lock 18 provides access by a player to each cockpit. All of these elements are interfaced to the local processor 19.

Figure 3:
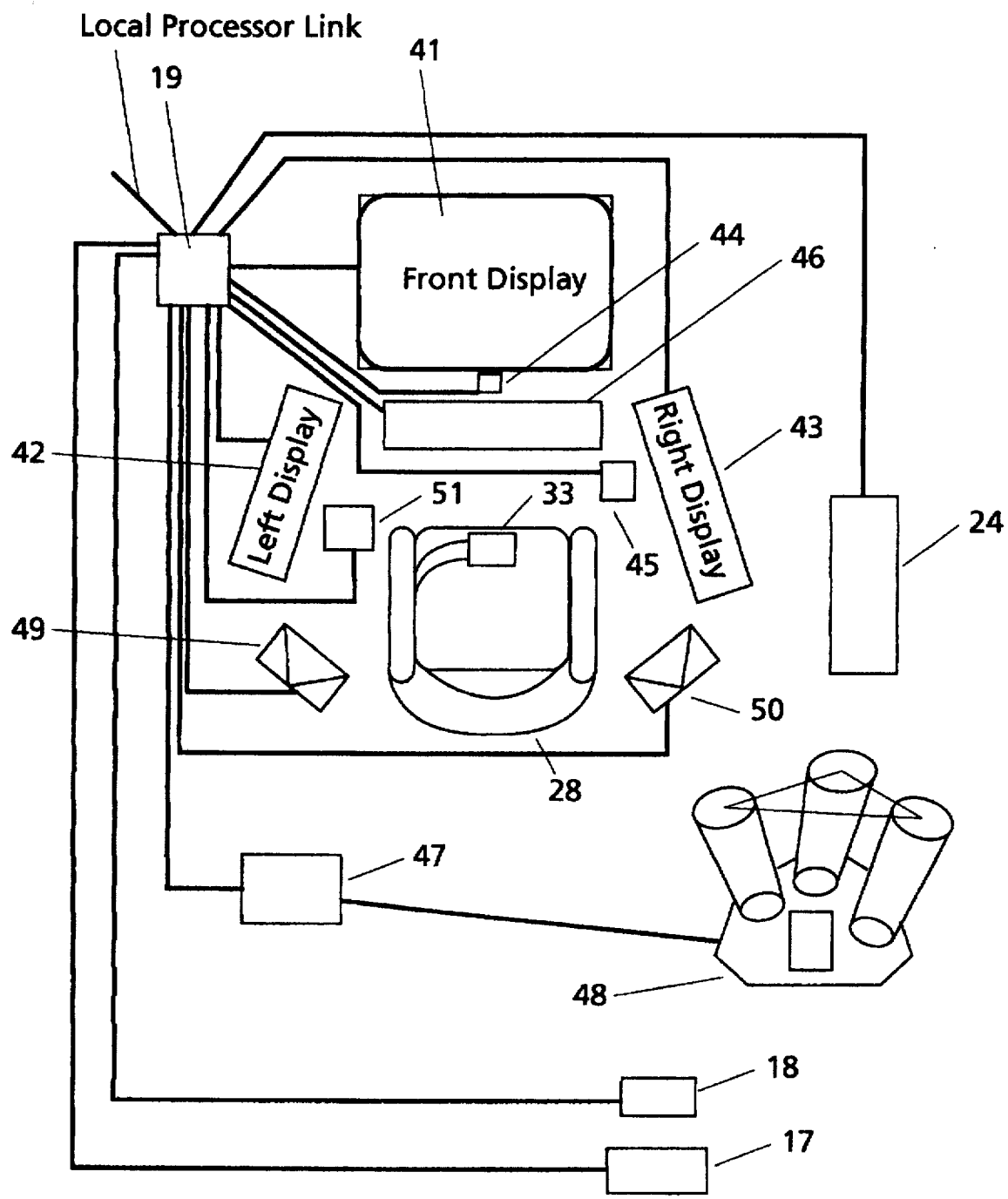
Figure 7:
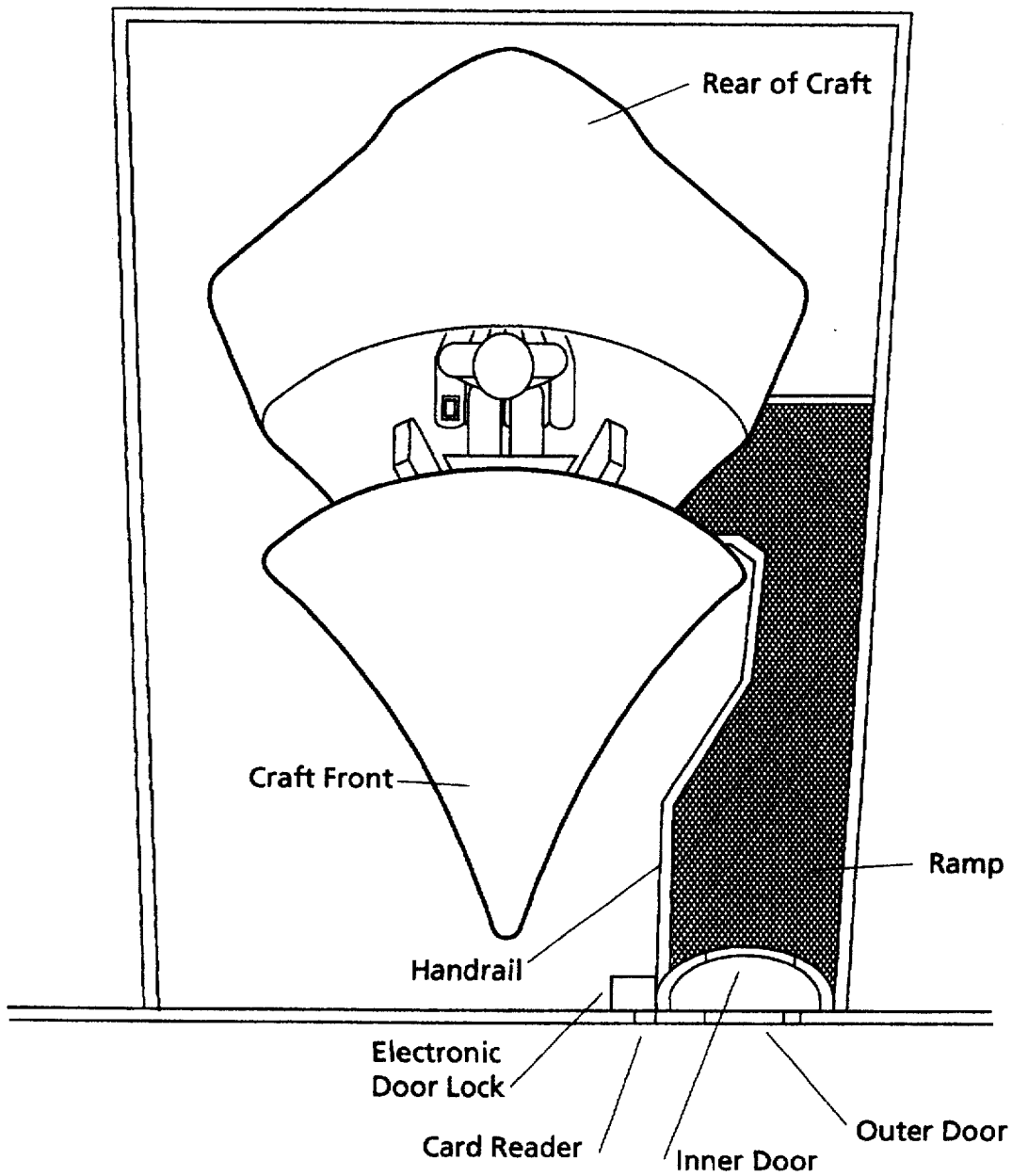
Figure 8:
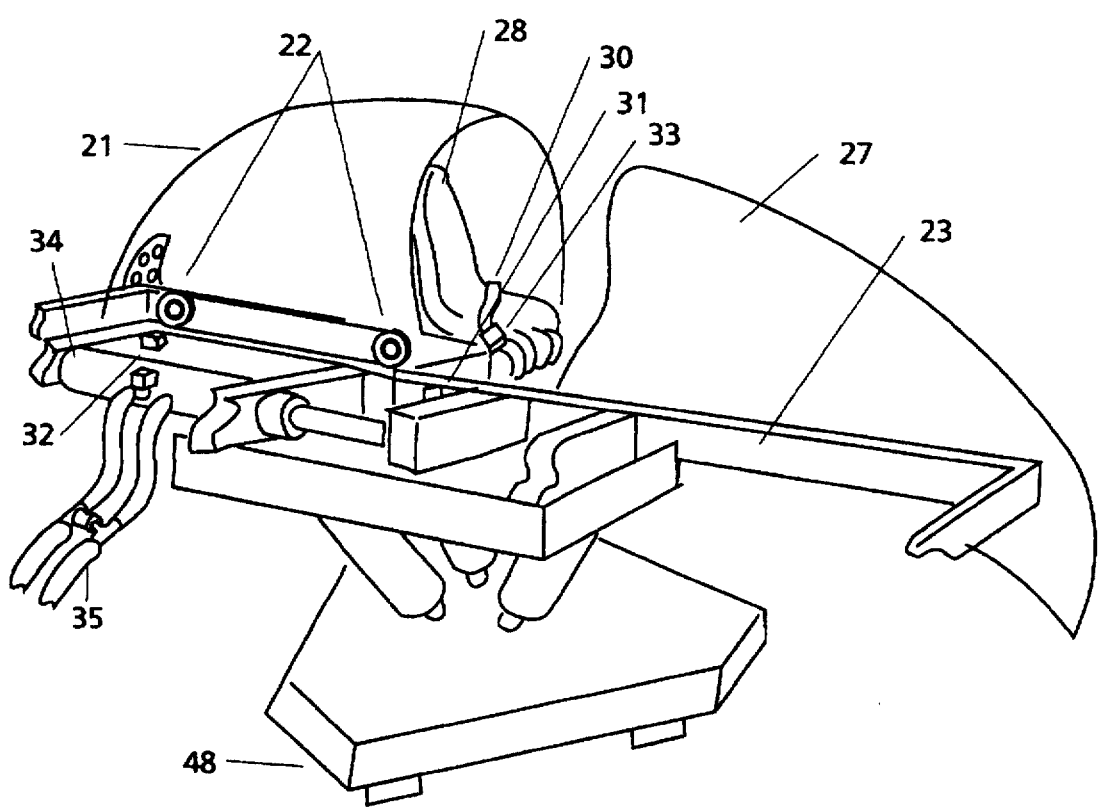

A player approaching a cockpit of the system must first swipe that player's magnetically readable identification or debit card through a external card reader 17 (FIG. 3 and 7). The card reader notifies the cockpit processor 19 of the identity of the player. Upon verifying proper credit in the player's account, and deducting a charge therefrom, the local processor releases the electronic lock 18, permitting the player to enter the doors 15. The player may then climb ramp 14 to gain access to the cockpit. A railing 13 is provided at an edge of the ramp to prevent the player from falling underneath the cockpit. At this time, the local processor also requests player specific information from the hub processor 40.

Figure 4:
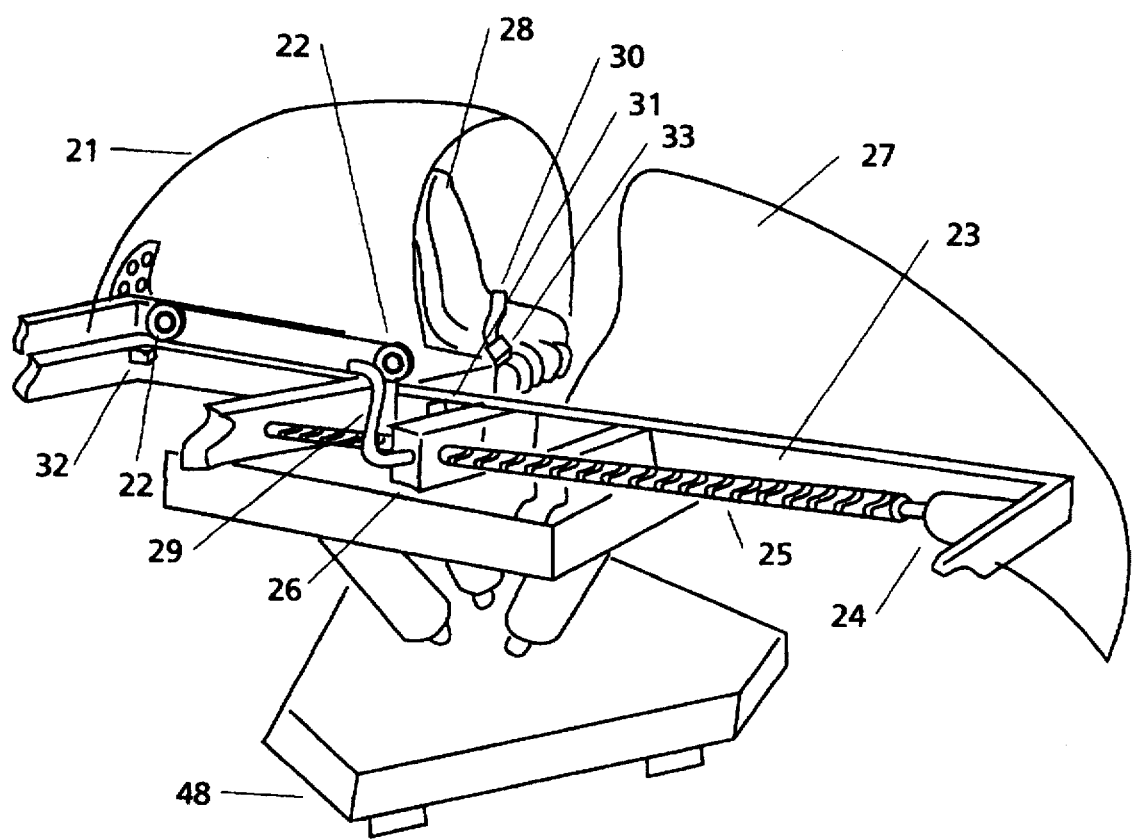

Each cockpit 20 (FIG. 2) has a seat 28 (FIGS. 4 and 5) for a player attached to a movable cockpit back 21. The cockpit back 21 slides by means of wheels 22 (FIG. 4) on rails 23. When a player desires to enter the cockpit, and the processor 19 has released electronic lock 18 to grant the player access to the cockpit, reversible motor 24 rotates threaded worm 25 in a first direction of rotation. A split nut 26 disposed about threaded worm 25 is attached to the cockpit back 21. This nut is split so that in event of power failure or other emergency the nut may be released from the worm 25 in one preferred embodiment, or detached from the cockpit back 21 by means of release pin 29 in another preferred embodiment of the present invention, to allow the cockpit to be manually opened. Rotation of the worm 25 in the first direction causes the nut 26 and cockpit back 21 to be driven away from the cockpit front 27 sufficiently far, as sensed by limit switch 32, that the player may enter the cockpit and secure himself into the seat 28.

In another preferred embodiment of the present invention, the cockpit back is mounted to the full motion base, and the cockpit front moves on wheels on rails to allow ingress or egress of a player. In this embodiment, the mechanical arrangement for moving the cockpit front is similar to that heretofore described for moving the cockpit back in the embodiments in which the cockpit back moves to allow ingress or egress of the player.

The player enters the cockpit, seats himself in seat 28, and fastens the restraint system consisting in the present preferred embodiment of five point harness 30 as sensed by buckle switch 33, the player must keep her hands upon the restraint as sensed by an additional safe hands switch (not shown) to indicate to the local processor 19 that the player's hands are in a safe position, and motor 24 drives the worm 25 in a direction of rotation opposite to the first direction to close the cockpit. The split nut 26 and attached cockpit back 21 are driven towards the cockpit front 27 until the cockpit is closed as sensed by limit switch 31. The cockpit closes upon an elastomeric seal (not shown) to limit extraneous visual and auditory distractions. This seal has been found to enhance the immersion of the player in the game universe by excluding extraneous noises.

Should the player release the safe hands switch (not shown) or release the buckle as sensed by buckle switch 33 prior to the time that the cockpit has closed as sensed by limit switch 31, the motor 24 is reversed to drive the threaded worm in the first direction and open the cockpit. This feature is necessary to prevent the cockpit back 21 from closing on and injuring some part of the player's body (not shown).

An alternate preferred embodiment may utilize a hydraulic cylinder 34 to slide the cockpit back 21 on rails 23. An emergency bypass valve and orifice 35 allows the cylinder and cockpit back 21 to be slowly released in the event of power or system failure.

The cockpit processor 19 signals the identity and availability of the player to the hub processor 40 (FIG. 3) and receives from the hub processor information regarding the proper initial location of the player in the game universe. The local processor 19 then extracts appropriate images from its local library of images, assembles them, and presents suitable graphics on the front display 41, the left wing display 42, and the right wing display 43. These images will be updated continuously throughout the duration of the player's immersion in the game to provide suitable stimulation to the player. Similarly, suitable audio messages are synthesized from a library of sound clips together with real time digitized sound transmitted from the microphones 44 in selected cockpits at the same or another location and presented to the player through a left speaker 49 and a right speaker 50. The player may speak into microphone 44, sound from which will be digitized and transmitted to other cockpits for communication in real time.

For optimum realism, it has been found necessary that the front display 41 be a high resolution display of at least 1024 by 768 pixels resolution, with 1280 by 1024 preferred, while a lower resolution of 680 by 480 pixels has been found to be adequate for the side displays 42 and 43. For adequate realism, all three displays must be color, and the graphics displayed on both the front 41 and side displays 42 and 43 must be updated for motion at from thirty to sixty frames per second. Further it has also been found necessary for adequate realism that the system be capable of rendering complex images involving two thousand meshed triangles per display. The display system must also be capable of performing lighting computations to determine the proper shading of each polygon, and of applying textures to images. The graphics system must also be capable of removing hidden surfaces.

In the preferred embodiment the center display 41 comprises a high resolution color cathode-ray tube monitor having a resolution of 1280 by 1024 pixels and a 21-inch diagonal measurement. It has been found that a Hitachi model CM2198 MSG monitor is a suitable monitor for the center display. It has been found that a Sharp liquid crystal display model 6RA52 displaying 640 by 480 pixels in a 16 by 12 inch format is a suitable display for the side or wing displays 42 and 43.

The present invention is not intended to be limited to the specific display devices herewith disclosed. Other display devices that meet the requirements of full color, resolution, update rate, and physical dimensions may also be used.

In another preferred embodiment, the side or wing display panels 42 and 43 consist of active matrix liquid crystal display panels in a six by eight inch diagonal format. An Optical Imaging System's Inc. model CQ 8060 is adequate for the application.

Figure 6:
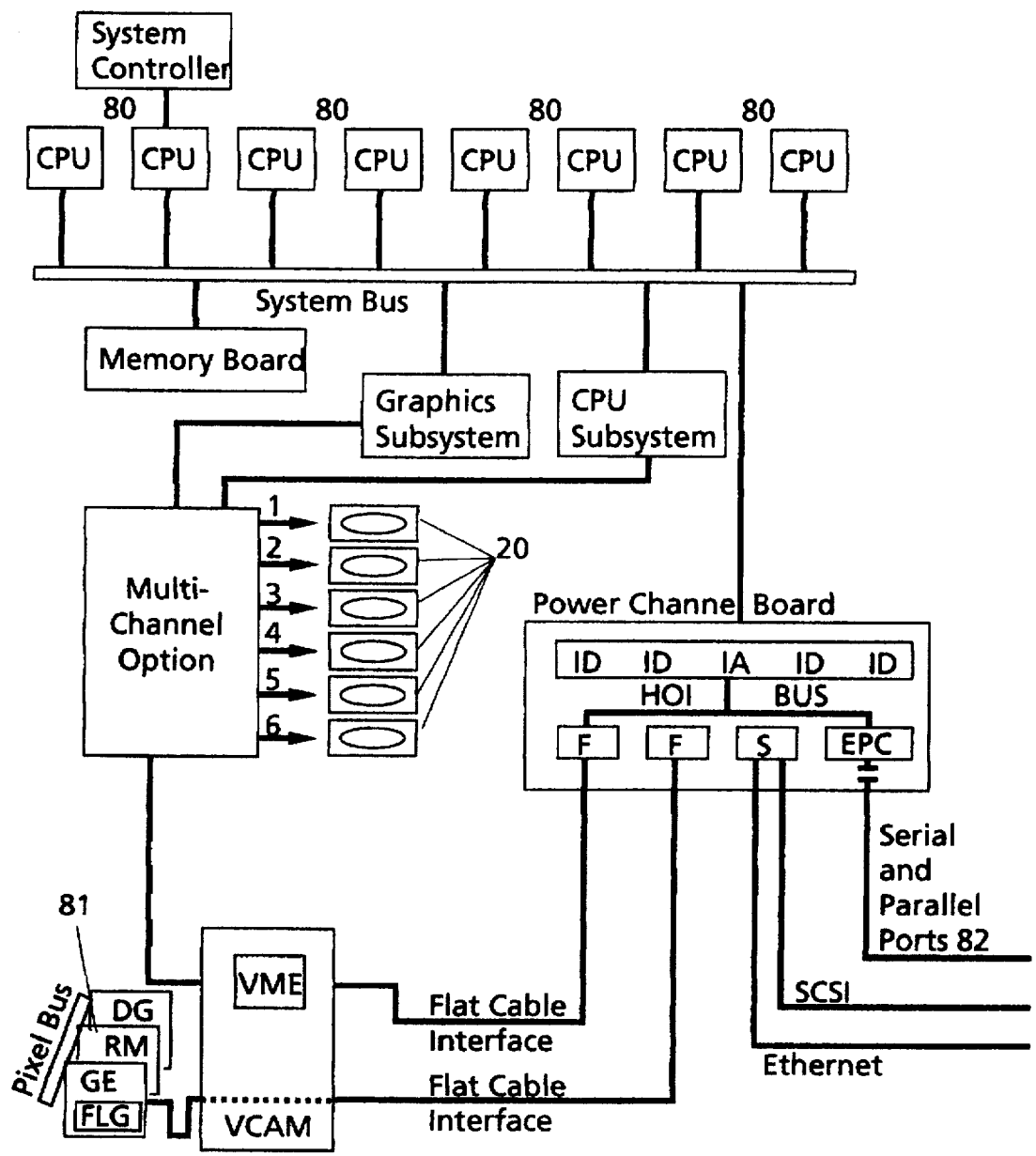

The Silicon Graphics Onyx Reality Engine II system (FIG. 6), equipped with eight 150 MHz MIPS R4400 processors 80, 192 megabytes of RAM, eighteen raster managers 81 each having a 16-megabyte texture memory, and 18 gigabytes of disk has been found suitable as a local processor 19 for up to five cockpits 20. The buckle switches 33, control devices 45, magnetic card readers 17 and 51, and touch panels 46 are interfaced to this system through the serial and parallel ports 82. In an alternate preferred embodiment, a maximally configured Silicon Graphics Onyx Reality Engine III (Kona) model is suitable as a local processor for up to twelve cockpits.

The player may enter control information to the local processor 19 by means of control devices 45 and touch panel 46. In the preferred embodiment, control devices 45 include a joystick. This control information is used by the local processor 19 to control a digital simulation of a spacecraft in the game universe. Acceleration and attitude information from the simulation of the spacecraft associated with each cockpit is fed to the motion controller 47, which operates the electropneumatic servos of the full motion base 48 which may move the cockpit 20 to provide tactile and kinesthetic feedback to the player. A motion sickness bag (not shown) is provided in each cockpit for use in the event that motion sickness results.

An electropneumatic motion base such as a PEMRAM 303 HPR/500 made by Denne Developments Ltd of Bournemouth, England, has been found suitable for the motion controller 47 and full motion base 48. It has been found that an electropneumatic full motion base of the PEMRAM type offers faster motion, and thus more fully immerses the player in the game universe, than does a hydraulic motion base.

Interior surfaces of the cockpit are padded with a medium density molded foam material to prevent injury to a player should that player release the restraint system during an experience in the game universe. This material is also water resistant to prevent damage in the event a player undergoes motion sickness.

Location and attitude information from a digital simulation of motion of the spacecraft representing each occupied cockpit is transmitted from the local processor 19 to the hub processor 40. Location and attitude information of other simulated spacecraft in the game universe may be transmitted from the hub processor 40 back to the local processor, whereupon graphical information representing the relative position and attitude of these additional nearby spacecraft may be merged with images representing other objects in the game universe and presented to the player as suitable graphics on the front display 41, the left wing display 42, and the right wing display 43.

Figure 11:
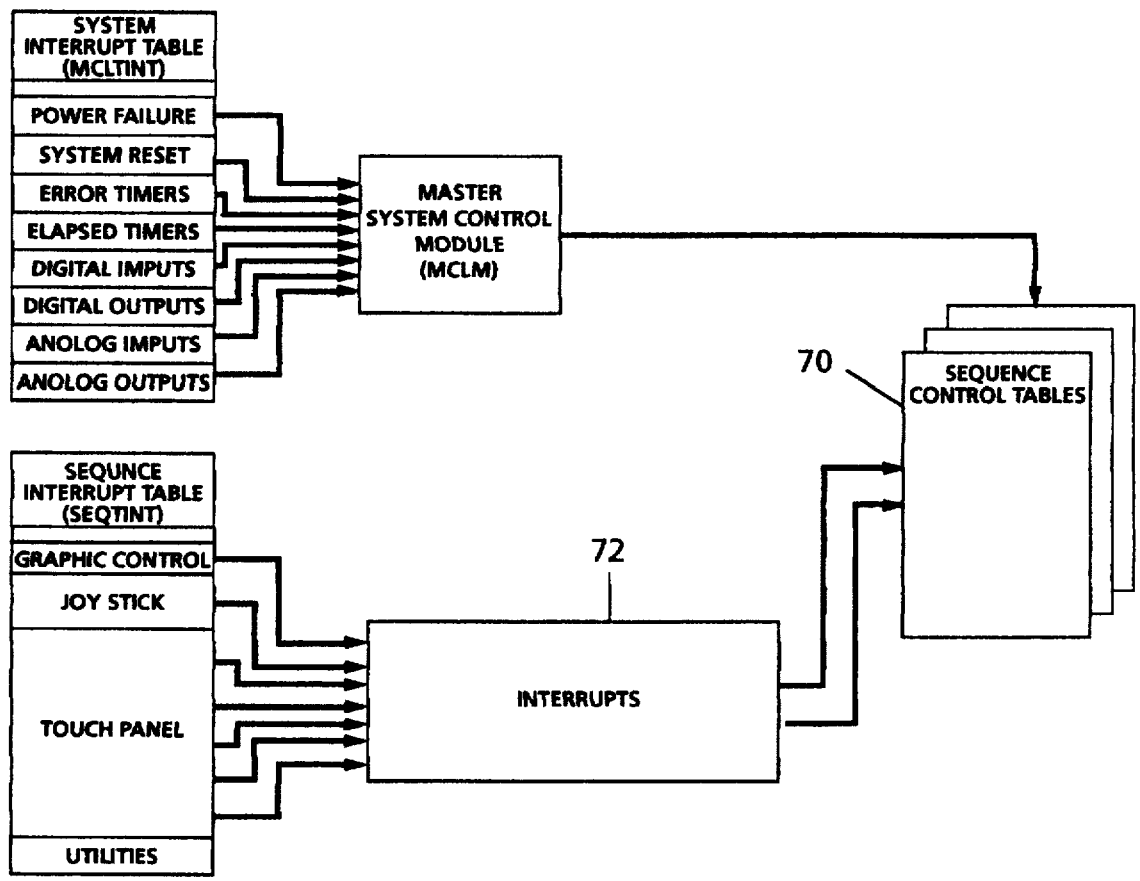

The real time software for each cockpit is interrupt driven. Each input event, for example the player fastening the restraint device to activate the restraint buckle switch 33, generates an interrupt in the local processor 19. Upon answering the interrupt, an interrupt handling routine 72 (FIG. 11) marks the incoming event and associated information in a sequence control table 70. Each sequence control table further comprises an enable subtable, a status subtable, a function subtable, and a parameter subtable. Separate sequence control tables 70 are provided for the graphics processing, the spacecraft motion simulation, and for a number of other activities controlled from the touch panel in each cockpit.

Figure 9:
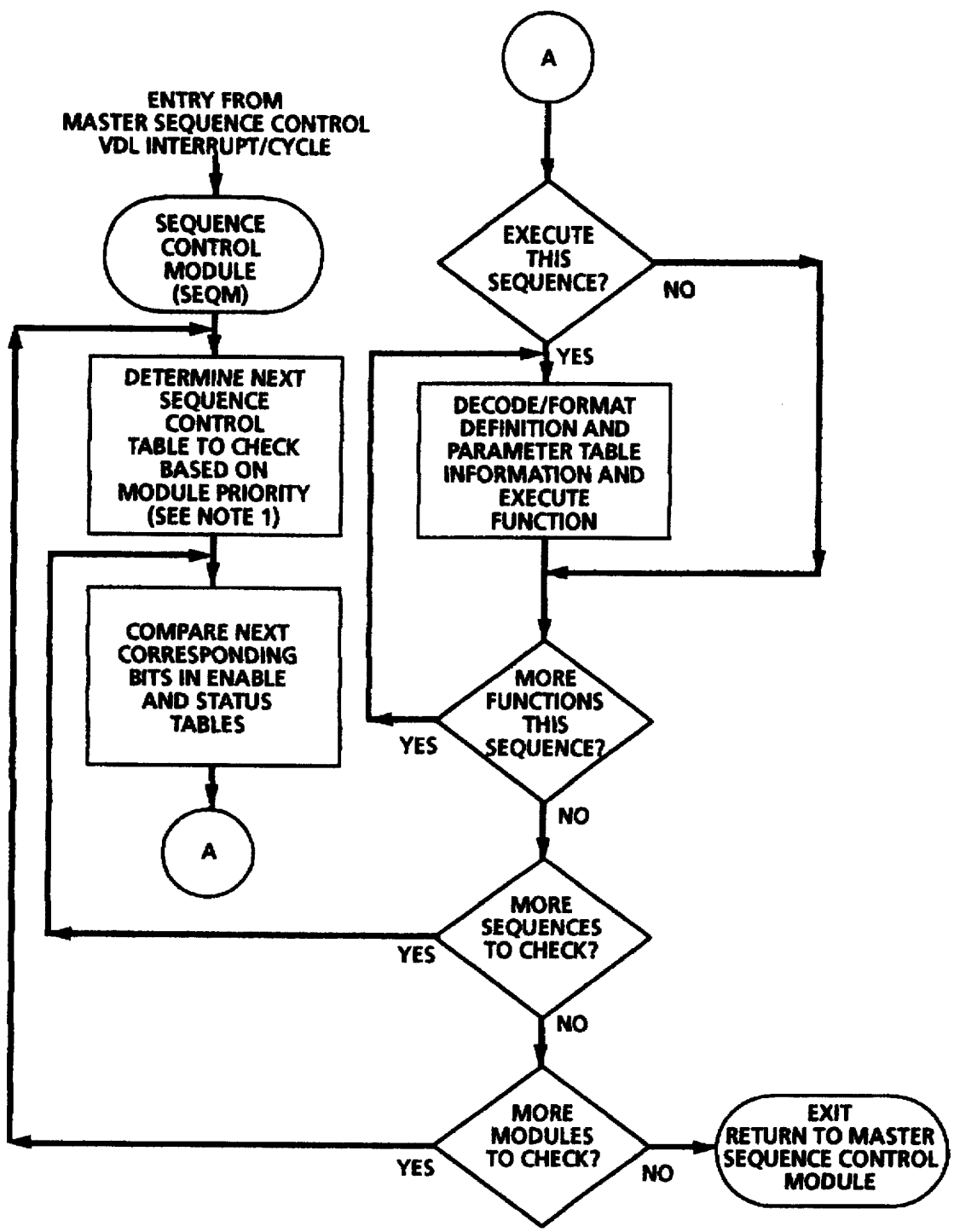
Figure 10:
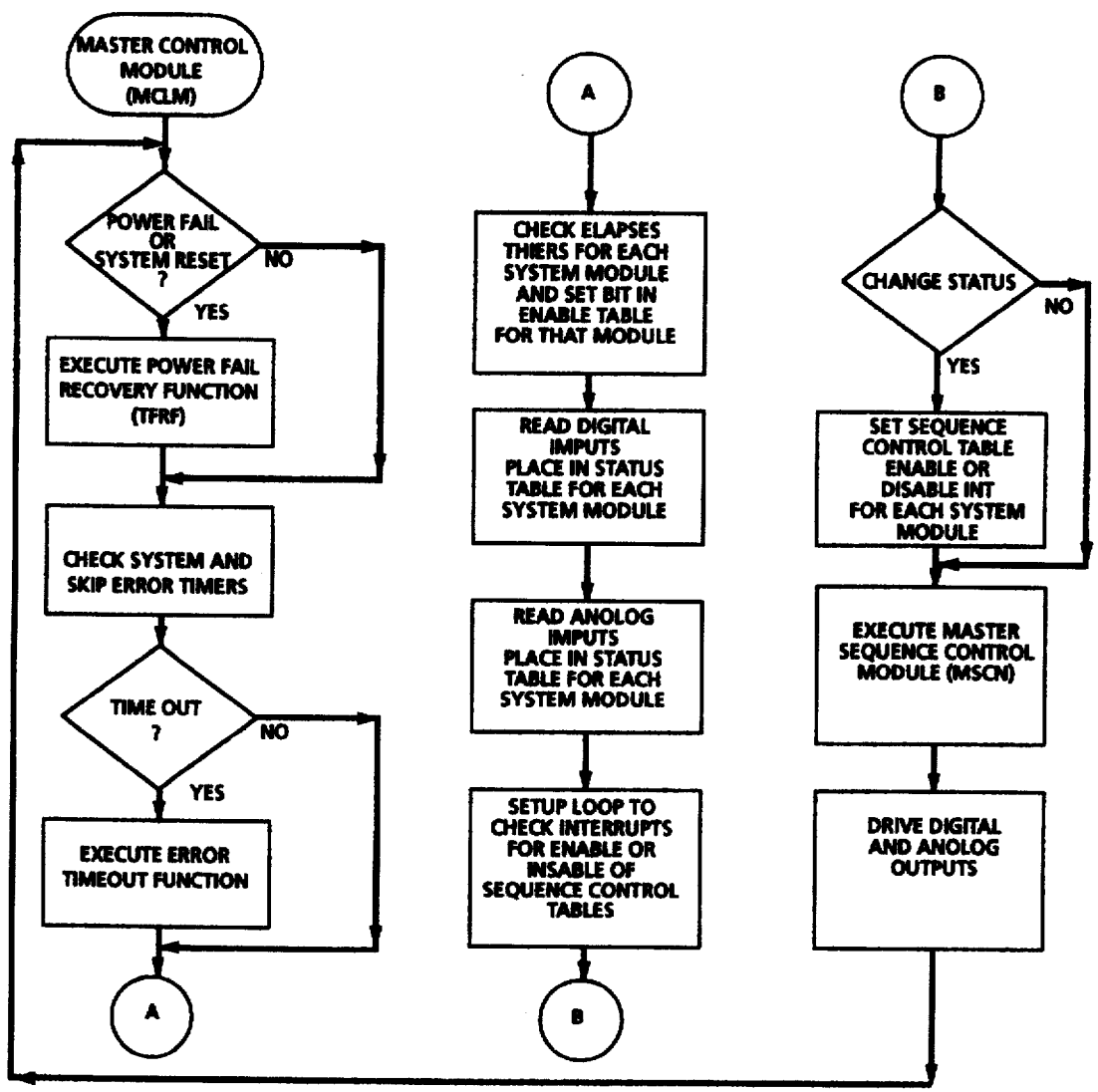

A master control module (FIG. 10) initializes the sequence control tables when the system power is turned on. This routine then instantiates one or more copies of the system control module (FIG. 9). This system lends itself to running on a multiprocessor computer such as the Onyx system because, through proper handling of the flags in the sequence control tables, it is possible for several sequence control modules to execute different functions in the system simultaneously.

A sequence control module (FIG. 9) reads the enable subtable and status subtable of each sequence control table 70 to determine which functional routines must execute, and dispatches the required routines 72.

The game universe is constructed in part by players. A player may build a world on a home computer by selecting a planet size from a menu of options. Similarly, a star type, a type, direction, and inclination of orbit relative to the ecliptic, a number of political, social, and biosphere factors including characteristics of any sentient species, a level of industry, and a number of military and architectural characteristics may also be selected from the menus. Each selection is charged against a ration of planetary points.

When a player has constructed a world, the player may submit that world to the hub processor by modem or on a floppy disk, which will then assign planetary coordinates for that world in the game universe. A player may visit those worlds he or she has submitted, as well as other worlds, space stations, stars, black holes, and wormholes created by other players or by the computer, in the course of an experience in a cockpit my means of suitable entries on touch panel 46.

When a player first swipes his identity card in the external card swiping device 17, that player is allotted an amount of time for play in the cockpit. When a player's allotted time for play expires, the player may swipe his identity card in the internal magnetic identity card reader 51. The local processor 19 will then determine whether sufficient credit remains in the player's account for additional play time. If sufficient credit exists, the local processor 19 may deduct a suitable charge from the player account and allow play to continue. Should the account have insufficient credit for additional play time, the player chooses to end his experience, or a preset maximum play time be reached, local processor 19 will then terminate operation of the motion base and activate motor 24, rotating worm 25 to drive the nut 26 to separate the cockpit back 21 from the cockpit front 27. When the cockpit back 21 has sufficiently separated from the cockpit front 27, the player may exit from the cockpit.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. An entertainment system for use by a plurality of players comprising:
    a plurality of cockpits each having a plurality of computer graphical display devices disposed therein, wherein at least one of said computer graphical display devices further comprises a color display of not less than 1024 by 768 pixels resolution, where each of said cockpits is disposed upon a full motion base;
    a plurality of local processors each for driving the computer graphical display devices of a plurality of cockpit shells;
    a hub processor responsible for maintaining a database of players and player virtual personae, for maintaining a description of a game universe, for communicating audio signals between local processors, and for communicating locations of craft between local processors.

2. The entertainment system of claim 1 wherein the audio signals are communicated in digital form.

3. The entertainment system of claim 2 wherein the full motion base is of the electropneumatic type.

4. The entertainment system of claim 3 wherein each cockpit further comprises a front section within which the computer graphical display devices are disposed, and a back section within which a seat for the player is disposed, wherein the back section is linearly separated from the front section when the player enters or exits from the cockpit, and wherein the back section is disposed against a rear surface of the front section when the full motion base moves.

5. The entertainment system of claim 4 wherein the plurality of computer graphical display devices disposed within each cockpit are so positioned as to subtend a visual field of a player seated within the cockpit of one hundred sixty degrees.

6. A cockpit for a multiplayer immersive computer driven game comprising:
    a front section within which at least three computer graphical display devices are disposed;
    a full motion base that may move;
    a back section within which a seat for a player is disposed, wherein the back section is linearly separated from the front section when the player enters or exits from the cockpit, and wherein the back section is disposed against a rear surface of the front section when the full motion base moves, thereby enclosing the player when the full motion base moves;
    wherein the front section and the back section are disposed upon the full motion base;
    control means through which a player may enter control inputs to the computer driving the game;
    apparatus for separating the back section from the front section and for securing the back section to the front section when the full motion base moves; and
    apparatus for securing the player to the seat when the full motion base is active.

7. The cockpit of claim 6 wherein the control means further comprises a joystick.

8. The cockpit of claim 7 wherein the control means further comprises a touch panel.

9. The cockpit of claim 8 further comprising a reader for a magnetically encoded card, where said reader is disposed within the front section of said cockpit.

10. An entertainment system for use by a plurality of players comprising:
    a plurality of cockpits each having a plurality of computer graphical display devices disposed therein, where each of said cockpits is disposed upon a full motion base;
    a plurality of local processors each for driving the computer graphical display devices of a plurality of cockpit shells;
    a hub processor responsible for maintaining a database of players and player virtual personae, for maintaining a description of a game universe, for communicating audio signals between local processors, and for communicating locations of craft between the local processors.

11. The entertainment system of claim 10, wherein at least one cockpit further comprises a front section within which the computer graphical display devices are disposed, and a back section within which a seat for a player is disposed, wherein the back section is linearly separated from the front section when the player enters or exits from the cockpit, and wherein the back section is disposed against a rear surface of the front section, thereby enclosing the player, when the full motion base moves.

12. The entertainment system of claim 10, wherein the hub processor is linked to at least one home computer.

13. The entertainment system of claim 10, wherein a first cockpit of the plurality of cockpits is located at a different retail establishment from a second cockpit of the plurality of cockpits.

* * * * *